United States Patent
Okamoto et al.

(10) Patent No.: US 12,172,742 B2
(45) Date of Patent: Dec. 24, 2024

(54) OUTBOARD MOTOR

(71) Applicant: YAMAHA HATSUDOKI KABUSHIKI KAISHA, Iwata (JP)

(72) Inventors: Shuhei Okamoto, Shizuoka (JP); Naoki Sugita, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 362 days.

(21) Appl. No.: 17/403,916

(22) Filed: Aug. 17, 2021

(65) Prior Publication Data

US 2022/0081086 A1   Mar. 17, 2022

(30) Foreign Application Priority Data

Sep. 11, 2020   (JP) .................. 2020-153168

(51) Int. Cl.
  *B63H 20/32*   (2006.01)
  *B63H 20/14*   (2006.01)
  *B63H 20/24*   (2006.01)
  *B63H 20/28*   (2006.01)

(52) U.S. Cl.
  CPC ............. *B63H 20/32* (2013.01); *B63H 20/14* (2013.01); *B63H 20/245* (2013.01); *B63H 20/28* (2013.01)

(58) Field of Classification Search
  CPC ...... B63H 20/32; B63H 30/14; B63H 20/245; B63H 20/28
  See application file for complete search history.

(56) References Cited

U.S. PATENT DOCUMENTS

| | | | |
|---|---|---|---|
| 6,283,809 B1* | 9/2001 | Takase | B63H 20/245 |
| | | | 440/89 R |
| 9,260,997 B2* | 2/2016 | Daikoku | F01N 3/046 |
| 9,376,194 B1* | 6/2016 | Jensen | F01N 13/082 |
| 2004/0226533 A1* | 11/2004 | Yazaki | F01N 13/12 |
| | | | 60/323 |
| 2010/0056002 A1 | 3/2010 | Konakawa et al. | |

FOREIGN PATENT DOCUMENTS

EP   1 852 589 A2   11/2007
JP   2015-145137 A   8/2015

OTHER PUBLICATIONS

Office Action in EP21189620.4, mailed Mar. 10, 2023, 6 pages.
Official Communication issued in corresponding European Patent Application No. 21189620.4, mailed on Feb. 8, 2022.

* cited by examiner

*Primary Examiner* — Syed O Hasan
(74) *Attorney, Agent, or Firm* — Keating & Bennett, LLP

(57) ABSTRACT

An outboard motor that significantly reduces or prevents discoloration around an exhaust hole includes an engine, a drive shaft, a propeller shaft, a housing, a discharge passage, and non-metal covers. The housing includes a discharge outlet to discharge an exhaust gas of the engine and the cooling water of the engine. The discharge passage guides the exhaust gas and the cooling water from the engine toward the discharge outlet. The covers are detachably attached to the housing so as to cover the discharge outlet and include at least one exhaust opening.

10 Claims, 12 Drawing Sheets

OUTBOARD MOTOR

CROSS REFERENCE TO RELATED APPLICATIONS

This application claims the benefit of priority to Japanese Patent Application No. 2020-153168 filed on Sep. 11, 2020. The entire contents of this application are hereby incorporated herein by reference.

BACKGROUND OF THE INVENTION

1. Field of the Invention

The present invention relates to an outboard motor.

2. Description of the Related Art

As a prior art, an outboard motor, which includes a discharge passage for guiding exhaust gas and cooling water from an engine, is disclosed (see Japanese Patent Application Laid-Open No. 2015-145137). In this type of outboard motor, generally, an exhaust opening for discharging the exhaust gas from the discharge passage to the outside is provided directly on a housing. For example, the exhaust opening is a hole which penetrates the housing from the inside of the housing to the outside of the housing.

In the conventional outboard motor, the hole penetrating the housing is used as the exhaust opening for discharging the exhaust gas which is discharged from the engine. In this case, fuel, which is contained in the exhaust gas discharged from the exhaust opening, may adhere to an outer surface around the exhaust opening of the housing and discolor the outer surface of the housing. In particular, if the housing is made of metal and the exhaust gas includes nitrogen oxide, the nitrogen oxide may oxidize the outer surface around the exhaust opening of the housing and discolor the outer surface of the housing.

SUMMARY OF THE INVENTION

Preferred embodiments of the present invention provide outboard motors each of which is able to significantly reduce or prevent discoloration around an exhaust opening.

An outboard motor according to a preferred embodiment of the present invention includes an engine, a drive shaft, a propeller shaft, a housing, a discharge passage, and a non-metal cover. The drive shaft extends downward from the engine. The propeller shaft extends in a direction intersecting with the drive shaft. The housing accommodates the engine, the drive shaft, and the propeller shaft. The housing includes a discharge outlet. The discharge outlet discharges exhaust gas and cooling water of the engine. The discharge passage guides the exhaust gas and the cooling water from the engine to the discharge outlet inside the housing. The cover is detachably attached to the housing so as to cover the discharge outlet. The cover includes at least one exhaust opening.

In preferred embodiments of the present invention, outboard motors able to significantly reduce or prevent discoloration around an exhaust opening are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
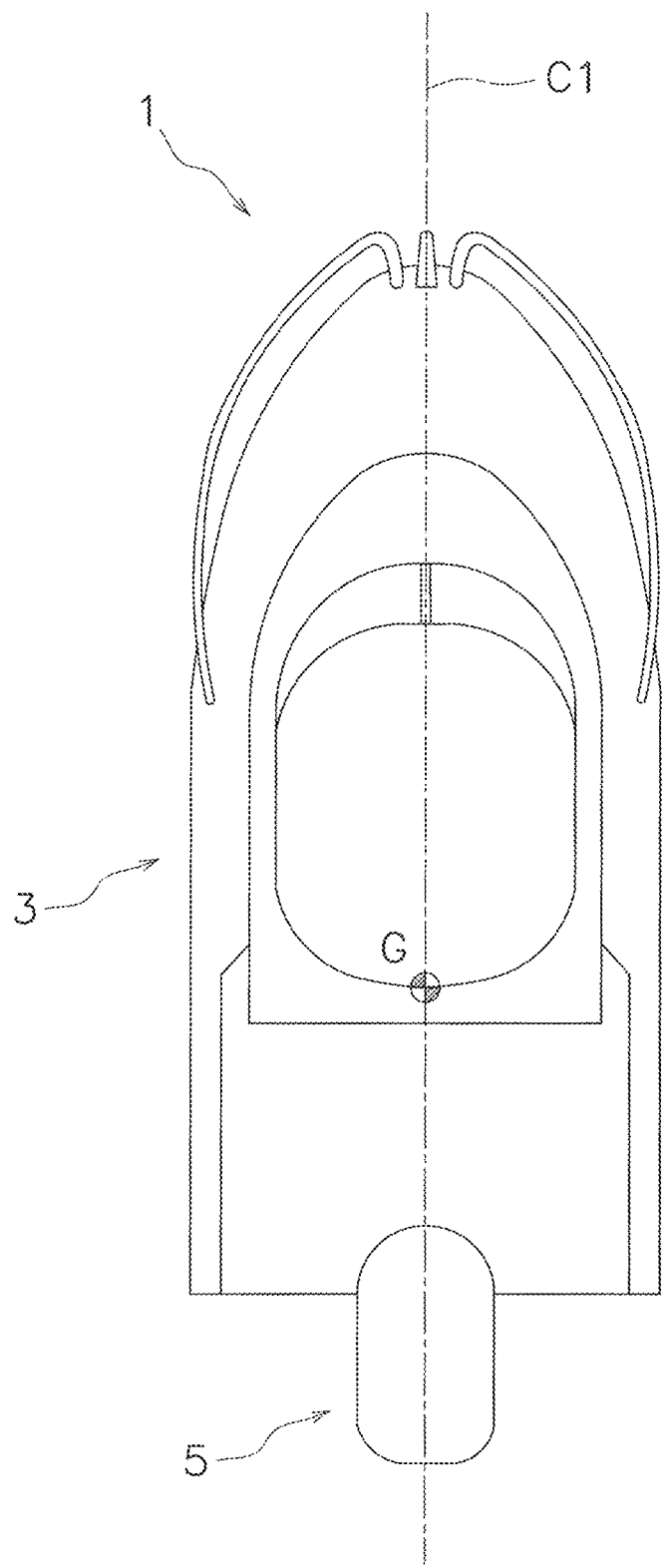
FIG. 1 is a top view of a watercraft according to a preferred embodiment of the present invention.

The following preferred embodiments of the present invention will be described with reference to the drawings. As shown in FIG. 1, the watercraft 1 includes a hull 3 and an outboard motor 5. In the present preferred embodiment, an example in which the number of the outboard motors 5 is one is described. There may be a plurality of outboard motors 5.

In the following description, a direction of each of front, rear, left, right, up, and down refers to a direction of each of front, rear, left, right, up, and down with respect to the hull 3. For example, as shown in FIG. 1, the center line Cl extending in a front-rear direction of the hull 3 passes through a center of gravity G of the hull 3.

The front-back direction is a direction along the center line Cl. The front is an upward direction toward an upper side along the center line Cl of FIG. 1. The rear is a downward direction along the center line Cl of FIG. 1. In the present preferred embodiment, the front-rear direction of the outboard motor 5 is defined by an attitude of the hull 3 (an attitude of FIG. 1) when the outboard motor 5 moves the hull 3 in the front-rear direction. The left-right direction of FIG. 2 corresponds to the front-rear direction of the outboard motor 5.

The left-right direction (a width direction) is a direction perpendicular to the center line Cl in FIG. 1. A left side is a direction perpendicular to the center line Cl of FIG. 1 and the direction toward a left side. A right side is a direction perpendicular to the center line Cl of FIG. 1 and the direction toward the right side. A vertical direction is a direction perpendicular to the front-back direction and the left-right direction.

Figure 2:
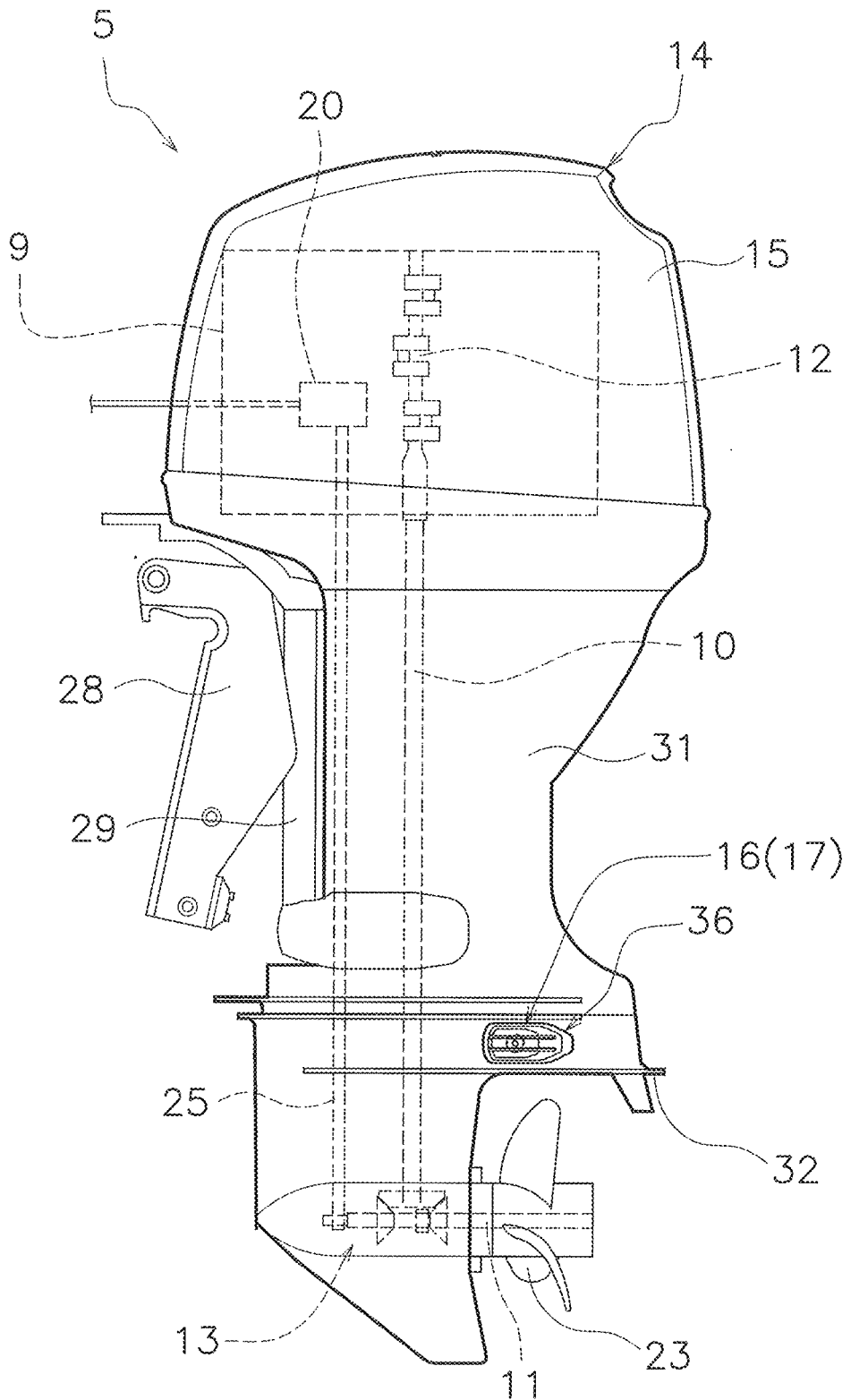
FIG. 2 is a side view of an outboard motor.

As shown in FIG. 2, the outboard motor 5 generates a propulsive force to propel the hull 3. The outboard motor 5 is attached to a stern of the hull 3. The outboard motor 5 includes an engine 9, a drive shaft 10, a propeller shaft 11, a housing 14, a discharge passage P (see FIG. 4), and a pair of covers 16, 17. The outboard motor 5 further includes a seal 18 (see FIG. 5). The outboard motor 5 further includes a shift mechanism 13 and a bracket 28.

The pair of covers 16, 17 are provided on both side surfaces of the housing 14, respectively. FIG. 2 shows the cover 16 which is provided on a side surface of the housing 14. The cover 17 is provided on the opposite side of the cover 16. The reference numeral of the cover 17 is shown in parentheses in FIG. 2. In the following, when the reference numeral of one of a pair is shown, the reference numeral of the other of the pair is shown in parentheses.

The engine 9 is a power source that produces the propulsive force of the hull 3. The engine 9 is located in the engine cover 15. The engine 9 includes a crankshaft 12. The crankshaft 12 extends in the vertical direction.

The engine 9 is connected to the drive shaft 10. The drive shaft 10 extends in the vertical direction. For example, the drive shaft 10 extends downward from the engine 9. The propeller shaft 11 extends in a direction intersecting the drive shaft 10. In the present preferred embodiment, the propeller shaft 11 extends in the front-rear direction. The propeller shaft 11 is connected to the drive shaft 10 via the shift mechanism 13. A propeller 23 is connected to the propeller shaft 11.

The shift mechanism 13 is driven by a shift actuator 20 via the shift member 25. The shift mechanism 13 switches a rotation direction of the power which is transmitted from the drive shaft 10 to the propeller shaft 11. Thus, the rotation direction of the propeller 23 is switched to a forward direction in which the hull 3 moves forward or a reverse direction in which the hull 3 moves backward.

The bracket 28 is used to attach the outboard motor 5 to the hull 3. The outboard motor 5 is detachably fixed to the stern of the watercraft 1 via the bracket 28. The bracket 28 includes a steering shaft 29. The outboard motor 5 is rotatably supported by the bracket 28 about the steering shaft 29.

As shown in FIG. 2, the housing 14 accommodates the engine 9, the drive shaft 10, and the propeller shaft 11. Specifically, the housing 14 houses the engine 9, the drive shaft 10, the propeller shaft 11, and the shift mechanism 13. The housing 14 includes a discharge outlet 33 (see FIG. 3A) which discharges an exhaust gas of the engine 9 and a cooling water of the engine 9. Specifically, the housing 14 includes the engine cover 15, a housing body 31, the discharge outlet 33 (see FIG. 3A), and a cover receiving portion 36 (see FIG. 3A).

The engine cover 15 covers the engine 9. The engine 9 is located inside the engine cover 15. The engine cover 15 is made of metal, for example. The engine cover 15 may be made of a resin.

The housing body 31 is located below the engine cover 15. The drive shaft 10, the propeller shaft 11, and the shift mechanism 13 are located inside the housing body 31. The housing body 31 is made of metal, for example. The housing body 31 may be made of a resin.

A cavitation plate 32 is provided on the housing body 31. For example, the cavitation plate 32 is provided on the housing body 31 above the propeller 23. Specifically, the cavitation plate 32 is provided on the housing body 31 in the vertical direction between the propeller 23 and the engine 9.

Figure 4:
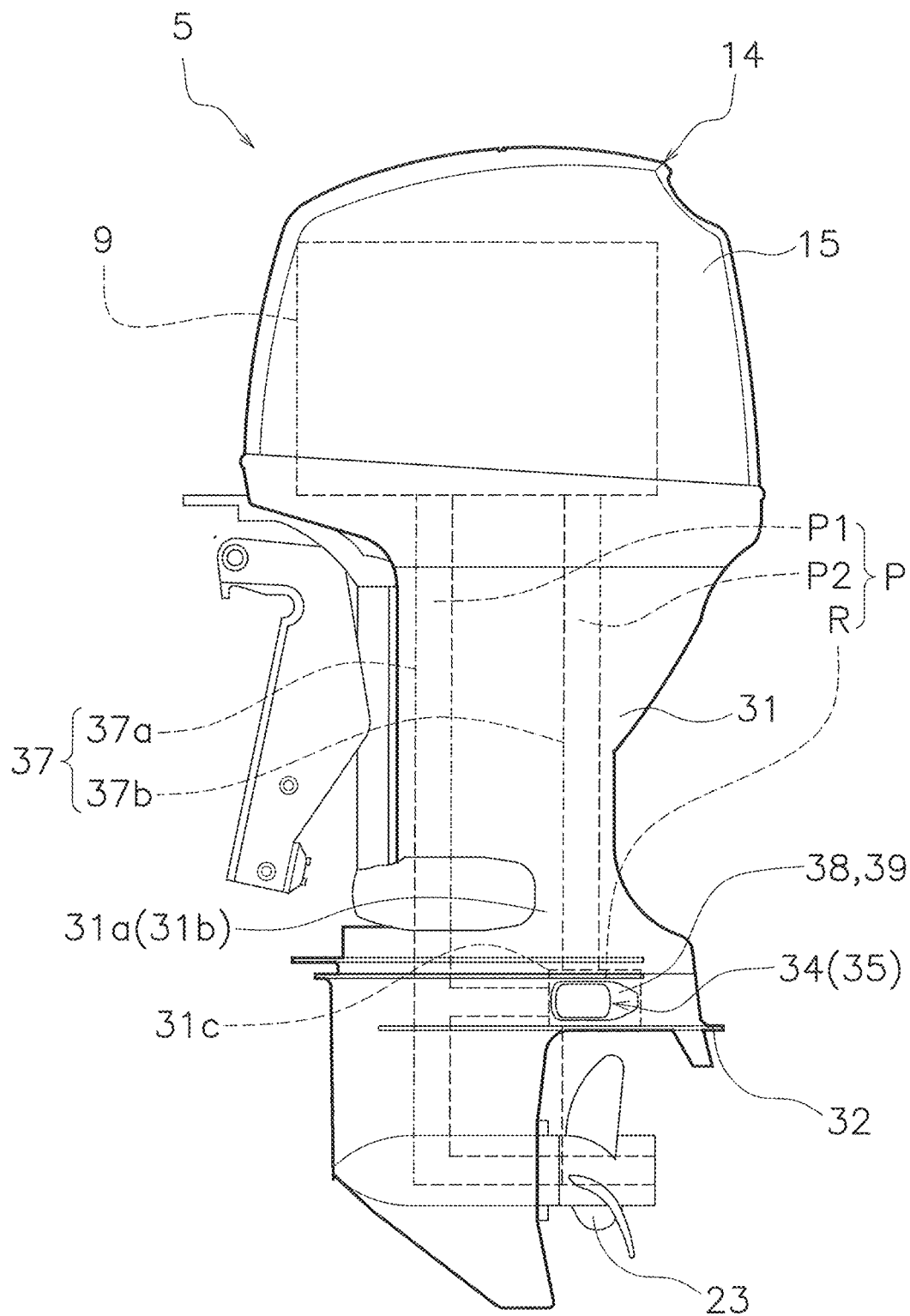
FIG. 4 is a side view of the outboard motor showing a discharge passage.

As shown in FIG. 4, the housing body 31 includes a wall 37 which defines the discharge passage P. For example, the wall 37 of the passage is integral with the inner surface of the housing body 31. The housing body 31 further includes sides 31a, 31b which define a discharge chamber R (see FIG. 4) described below.

Figure 3A:
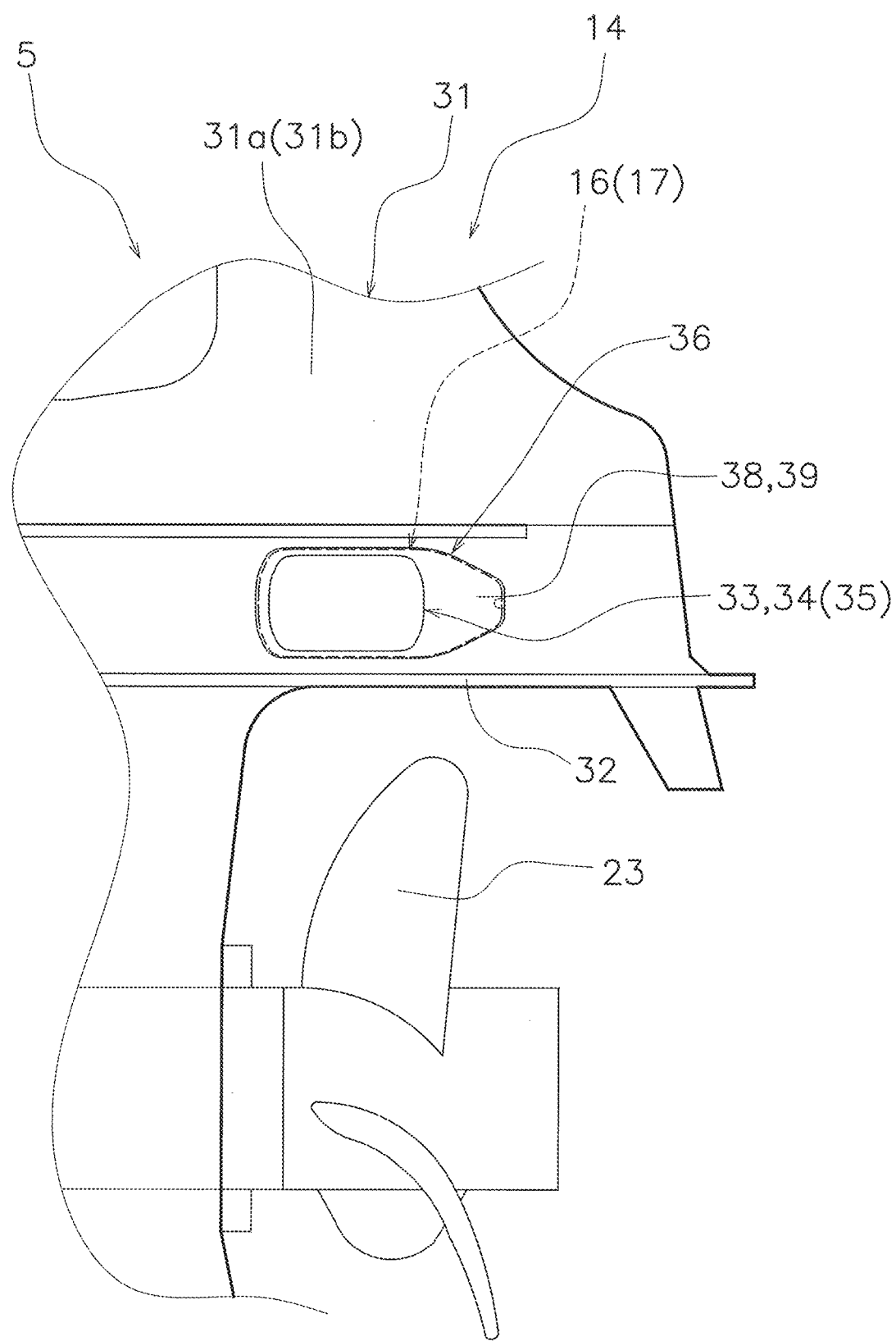
FIG. 3A is a side view in which the outboard motor is partially enlarged.

As shown in FIG. 3A, the discharge outlet 33 includes a pair of discharge outlets 34, 35. The pair of discharge outlets 34, 35 discharge the exhaust gas and the cooling water discharged from the engine 9. The pair of discharge outlets 34, 35 are provided in the housing 14. For example, the pair of discharge outlets 34, 35 are provided in the housing body 31 between the engine 9 and the cavitation plate 32.

The pair of discharge outlets 34, 35 are respectively provided on the both sides 31a, 31b of the housing body 31. For example, the pair of discharge outlets 34, 35 are respectively provided on the both sides 31a, 31b of the housing body 31 so as to face each other in the width direction (left-right direction).

Figure 3B:
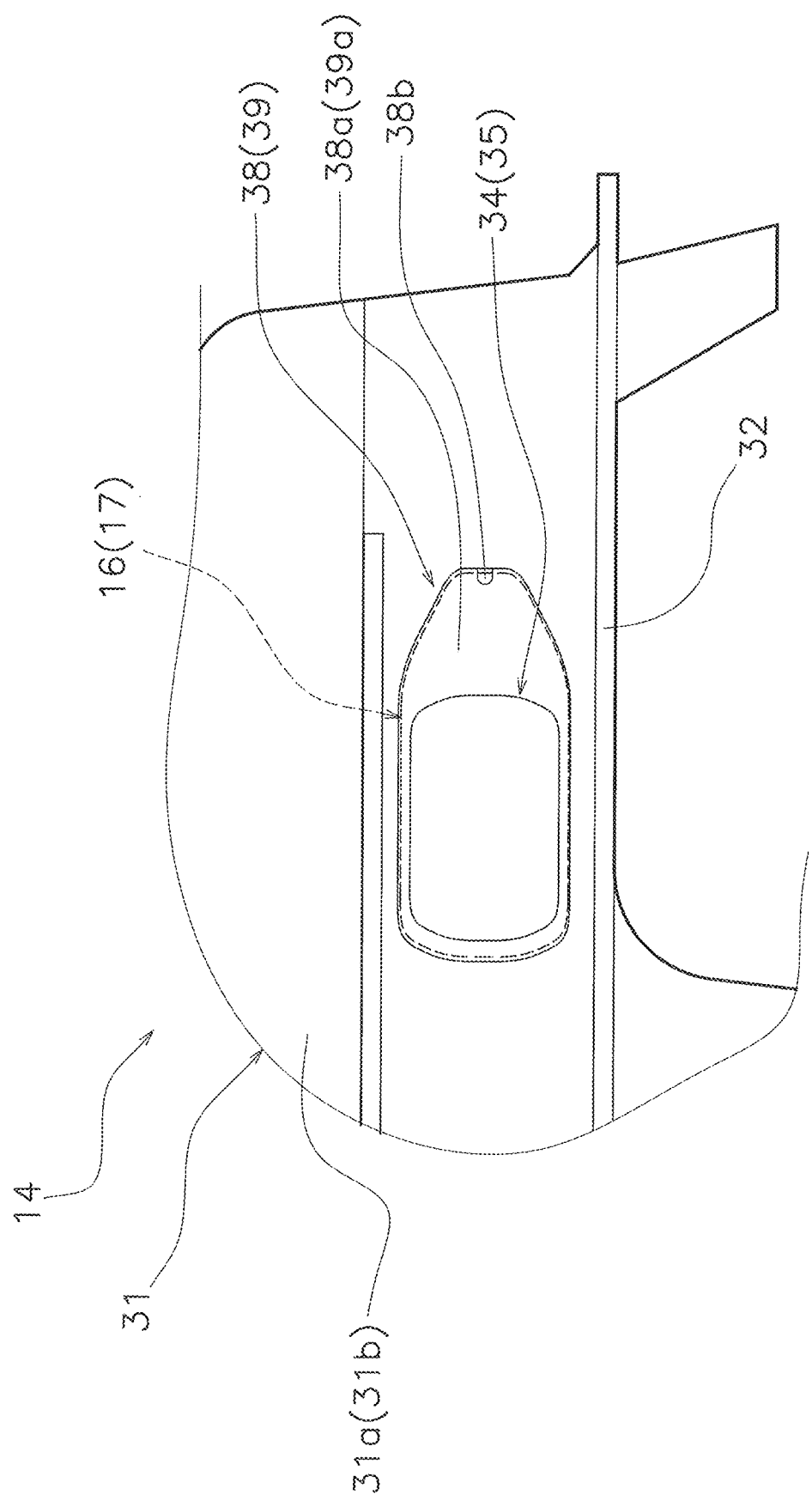
FIG. 3B is a side view in which a cover receiving portion of the outboard motor is partially enlarged.

As shown in FIG. 3B, each of the pair of discharge outlets 34, 35 is hollow. For example, each of the pair of discharge outlets 34, 35 is hollow and has a rectangular or substantially rectangular shape. Each of the pair of discharge outlets 34, 35 extends through the housing body 31 from an inside of the housing body 31 toward an outside of the housing body 31. For example, each of the pair of discharge outlets 34, 35 extends through each of the sides 31a, 31b which define the discharge chamber R (see FIG. 4).

As shown in FIG. 3A, the cover receiving portion 36 includes a pair of cover receiving portions 38, 39. The pair of covers 16, 17 are respectively provided on the pair of cover receiving portions 38, 39. The pair of cover receiving portions 38, 39 are provided on the housing body 31.

Each of the pair of cover receiving portions 38, 39 has a concave shape. The pair of discharge outlets 34, 35 are respectively provided on the pair of cover receiving portions 38, 39. For example, as shown in FIG. 3B, the pair of discharge outlets 34, 35 are respectively provided on bottom portions 38a, 39a of the pair of cover receiving portions 38, 39.

A positioning recess 38b (an example of a second recess) is provided on one of the pair of cover receiving portions 38, 39. In the present preferred embodiment, an example in which the positioning recess 38b is provided on the bottom portion 38a of the cover receiving portion 38 is described. A second positioning protrusion 16h (described below) of the cover 16 is located in the positioning recess 38b.

As shown in FIG. 4, the discharge passage P guides the exhaust gas and the cooling water from the engine 9 toward the pair of discharge outlets 34, 35 in the housing 14. The discharge passage P is defined by the housing 14. For example, the discharge passage P is defined by the wall 37 of the passage.

The discharge passage P includes the discharge chamber R, an exhaust passage P1 (an example of a first passage), and a cooling water passage P2 (an example of a second passage).

The discharge chamber R guides the exhaust gas and the cooling water toward the pair of discharge outlets 34, 35. The discharge chamber R is a space provided in the housing body 31 to discharge the exhaust gas and the cooling water from the pair of discharge outlets 34, 35. Specifically, the discharge chamber R is a space provided in the housing body 31 to discharge the exhaust gas and cooling water from the discharge outlets 34, 35 and exhaust openings 16b, 17b (described below) of the covers 16, 17.

The discharge chamber R is provided inside the housing body 31 between the engine 9 and the cavitation plate 32. The discharge chamber R is defined by the housing body 31. For example, the discharge chamber R is defined by the sides 31a, 31b of the housing body 31 and the walls 31c of the discharge chamber R.

The walls 31c of the discharge chamber R are provided on the inner surfaces of the sides 31a, 31b. The sides 31a, 31b of the housing body 31 include side walls of the discharge chamber R. The walls 31c of the discharge chamber R include a front wall of the discharge chamber R, an upper wall of the discharge chamber R, a lower wall of the discharge chamber R, and a rear wall of the discharge chamber R.

The exhaust passage P1 guides the exhaust gas, which is discharged from the engine 9, from the engine 9 toward the discharge chamber R. The exhaust passage P1 is connected to the discharge chamber R. For example, the exhaust passage P1 is defined by walls 37a for the exhaust gas and is provided on the inner surface of the housing 14 (the housing body 31). The exhaust passage P1 extends downward from the engine 9 and is connected to the discharge chamber R. The exhaust gas is discharged from the discharge chamber R to the outside of the housing 14 (the housing body 31) through the discharge outlets 34, 35 and the exhaust openings 16b, 17b of the covers 16, 17.

Further, the exhaust passage P1 guides the exhaust gas to the rear portion of the propeller 23. The exhaust passage P1 is connected to a space defined by a supporting portion of the housing 14 (housing body 31) which supports the propeller 23.

The cooling water passage P2 guides the cooling water, which is used to cool the engine 9, from the engine 9 toward the discharge chamber R. The cooling water passage P2 is connected to the discharge chamber R. For example, the cooling water passage P2 is defined by walls 37b for the cooling water and is provided on the inner surface of the housing 14 (the housing body 31). The cooling water passage P2 extends downward from the engine 9 and is connected to the discharge chamber R. The cooling water is discharged from the discharge chamber R to the outside of the housing 14 (the housing body 31) through the discharge outlets 34, 35 and the exhaust openings 16b, 17b of the covers 16, 17.

Figure 5:
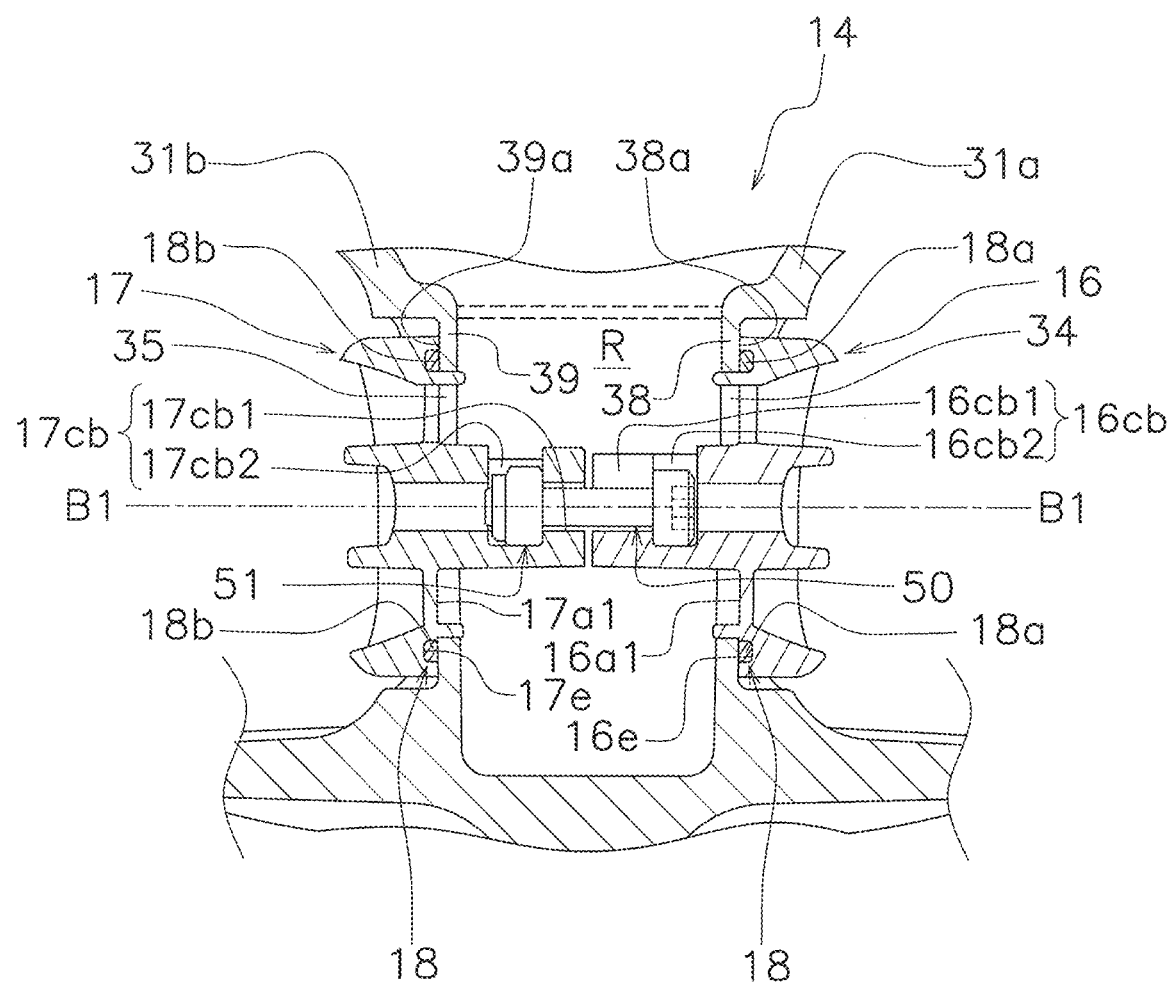
FIG. 5 is cross-sectional view of a vicinity of a cavitation plate of the outboard motor.

As shown in FIG. 5, the seal 18 includes a plurality of seals 18a, 18b, for example, two seals 18a, 18b. The seals 18a, 18b are respectively located between the housing 14 and the covers 16, 17. For example, the seals 18a, 18b are respectively located between the cover receiving portions 38, 39 and the covers 16, 17.

Figure 6A:
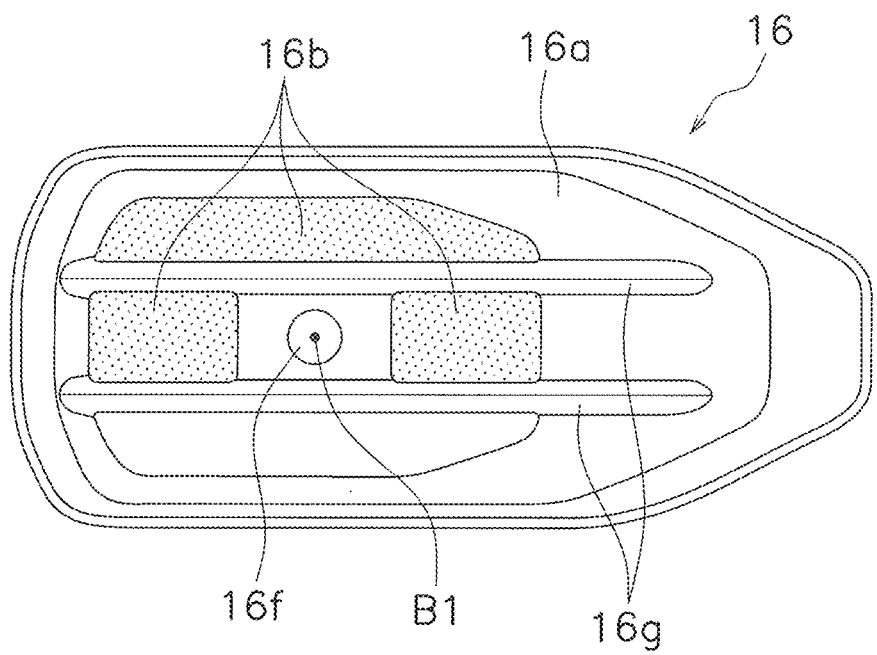
FIG. 6A is a top view of a left cover.
Figure 6B:
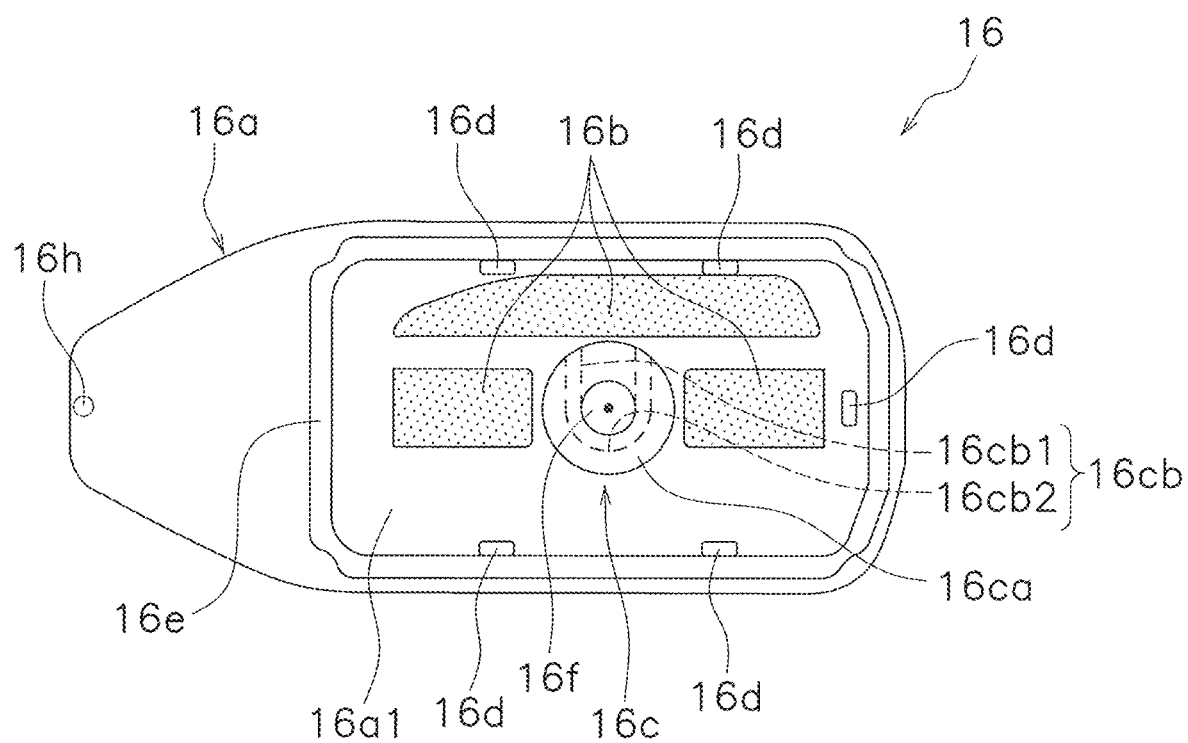
FIG. 6B is a bottom view of the left cover.
Figure 6C:
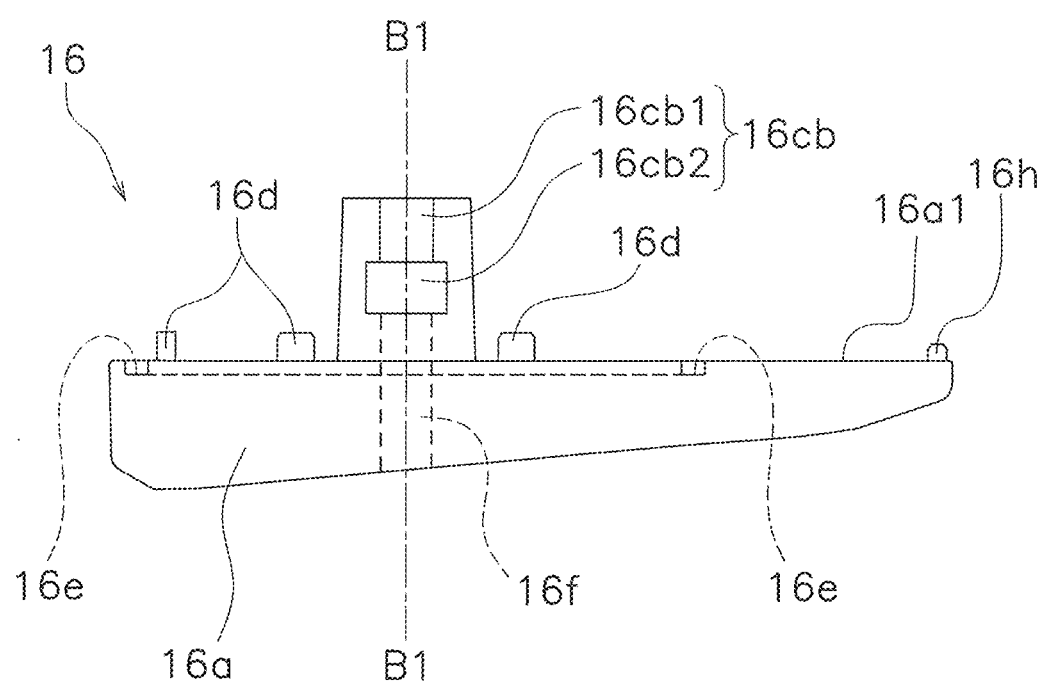
FIG. 6C is a side view of the left cover (an exhaust opening is not shown).
Figure 7A:
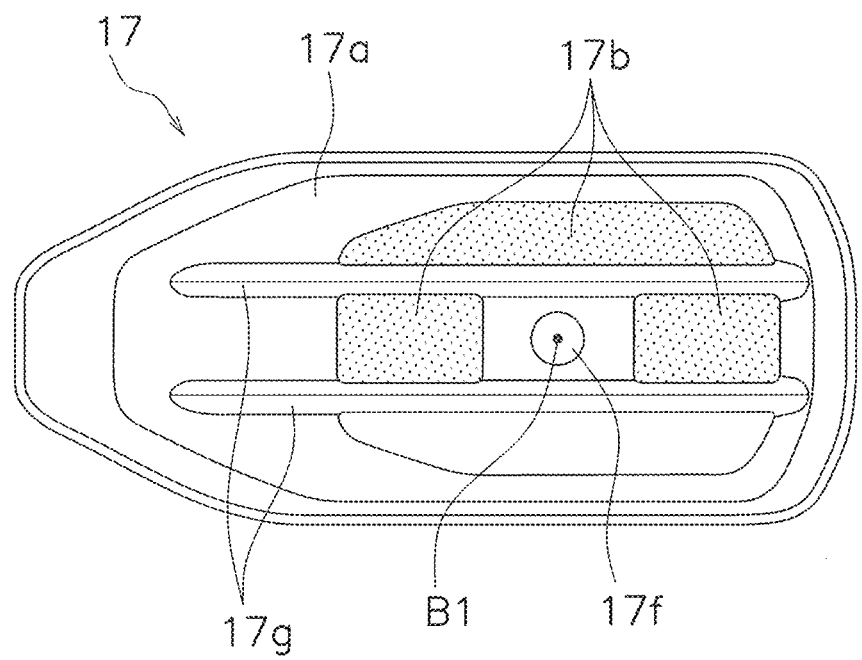
FIG. 7A is a top view of a right cover.
Figure 7B:
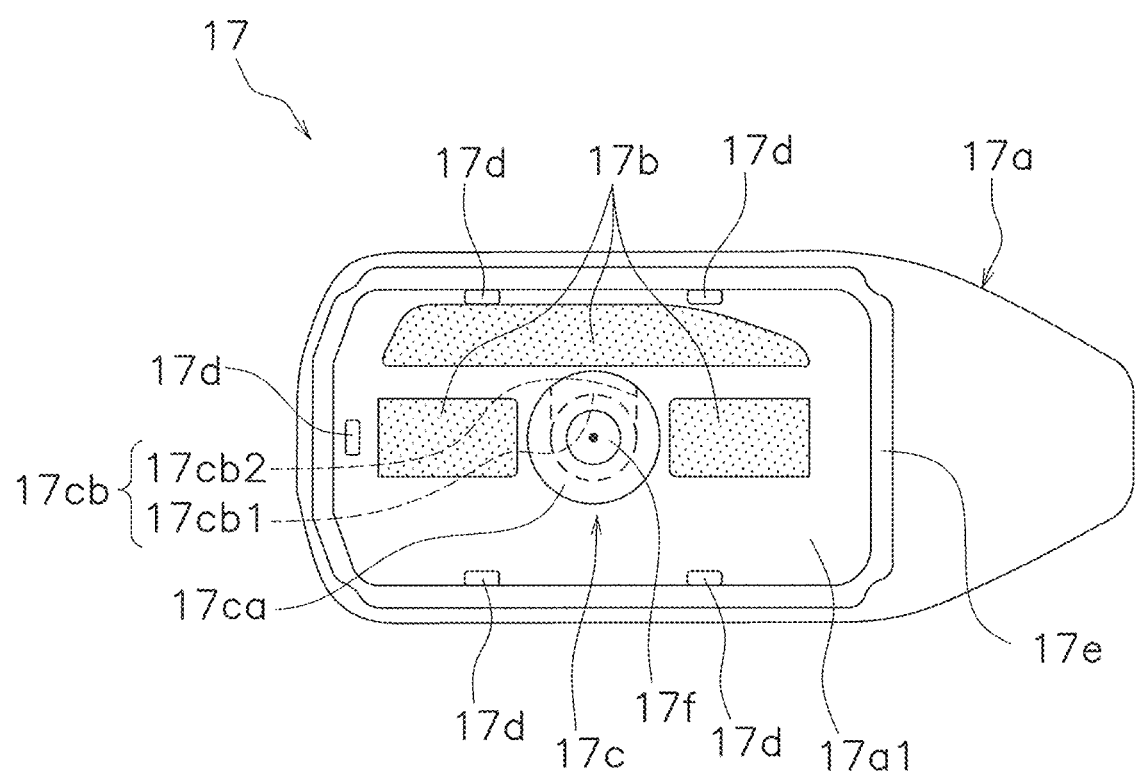
FIG. 7B is a bottom view of the right cover.
Figure 7C:
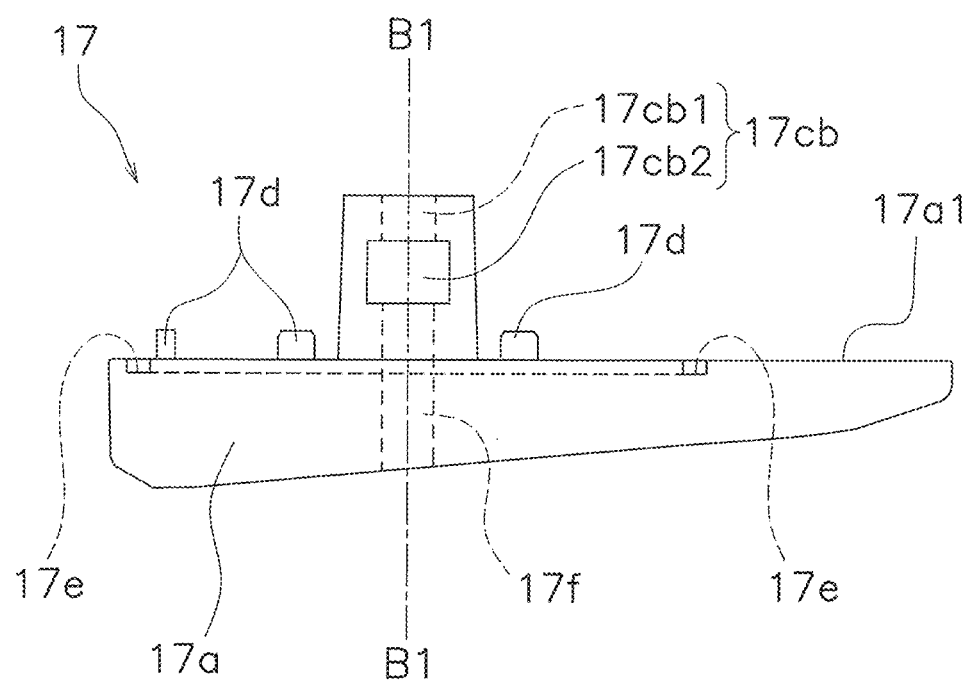
FIG. 7C is a side view of the right cover (an exhaust opening is not shown).

Specifically, as shown in FIGS. 5, 6C, and 7C, the seals 18a, 18b are respectively located between the bottom portions 38a, 39a of the cover receiving portions 38, 39 and facing surfaces 16a1, 17a1 of the covers 16, 17. More specifically, the seals 18a, 18b are respectively located between the bottom portions 38a, 39a of the cover receiving portions 38, 39 and seal grooves 16e, 17e of the covers 16, 17.

The seals 18a, 18b respectively abut the covers 16, 17 and the cover receiving portions 38, 39. Specifically, the seals 18a, 18b are respectively located in the seal grooves 16e, 17e of the covers 16, 17. In this state, when the covers 16, 17 are located on the cover receiving portions 38, 39 of the housing body 31, the seals 18a, 18b respectively abut the bottom portions 38a, 39a of the cover receiving portions 38, 39. The seals 18a, 18b are preferably made of resin, and may be O-rings made of resin.

Each of the pair of covers 16, 17 is made of a non-metal material. For example, each of the pair of covers 16, 17 may be made of a resin material. As shown in FIG. 3B, the pair of covers 16, 17 respectively cover the pair of discharge outlets 34, 35. The pair of covers 16, 17 are detachably attached to the housing 14.

Specifically, the pair of covers 16, 17 are respectively provided on the pair of cover receiving portions 38, 39. As shown in FIG. 5, the pair of covers 16, 17 are connected to each other by a bolt 50 and a nut 51 (an example of a connector).

For example, as shown in FIGS. 6A, 6B, 7A, and 7B, the covers 16, 17 include cover bodies 16a, 17a and at least one exhaust openings 16b, 17b. The covers 16, 17 further include bosses 16c, 17c, at least one first positioning protrusion 16d, 17d (an example of a first protrusion), and the seal grooves 16e, 17e (an example of a first recess). The covers 16, 17 further include holes 16f, 17f for receiving a tool.

The cover bodies 16a, 17a are respectively provided on the cover receiving portions 38, 39 (see FIG. 5). As shown in FIGS. 6B and 7B, the cover bodies 16a, 17a respectively include the facing surfaces 16a1, 17a1 which face the bottom portions 38a, 39a (see FIG. 5) of the cover receiving portions 38, 39.

As shown in FIGS. 6A and 7A, ribs 16g, 17g are respectively provided on the cover bodies 16a, 17a. For example, the pair of ribs 16g, 17g face each other and are integral with the cover bodies 16a, 17a. Thus, the rigidity of the cover bodies 16a, 17a is improved.

As shown in FIGS. 6A, 6B, 7A, and 7B, at least one exhaust openings 16b, 17b is provided on the cover bodies 16a, 17a. In the present preferred embodiment, an example in which a plurality of exhaust openings 16b, 17b are provided is described, for example, three exhaust openings are provided. In FIGS. 6A, 6B, 7A, and 7B, the exhaust openings 16b, 17b are indicated by hatching.

For example, the two exhaust openings 16b, 17b are provided on the cover bodies 16a, 17a between the pair of ribs 16g, 17g. The exhaust openings 16b, 17b are provided on the cover bodies 16a, 17a on an outside of the ribs 16g, 17g. In the present preferred embodiment, the exhaust openings 16b, 17b are provided on the cover bodies 16a, 17a above the ribs 16g, 17g.

The bosses 16c, 17c shown in FIGS. 6B and 7B are inserted into the pair of discharge outlets 34, 35 (see FIG. 3B) of the housing 14. The bolt 50 or the nut 51 is provided on the bosses 16c, 17c. For example, the bosses 16c, 17c include boss bodies 16ca, 17ca and slit portions 16cb, 17cb. The boss bodies 16ca, 17ca project respectively from the cover bodies 16a, 17a. The boss bodies 16ca, 17ca have a columnar shape.

The bolt 50 and/or the nut 51 (see FIG. 5) are located in the slit portions 16cb, 17cb. As shown in FIGS. 6B and 6C, the slit portion 16cb includes a small slit 16cb1 and a large slit 16cb2. The small slit 16cb1 is provided on the boss body 16ca. For example, the small slit 16cb1 is provided on the tip end side of the boss body 16ca. A shaft of the bolt 50 is located in the small slit 16cb1.

The large slit 16cb2 is provided on the boss body 17ca so as to be adjacent to the small slit 16cb1. For example, the large slit 16cb2 is provided on the base end side of the boss body 17ca. A slit width of the large slit 16cb2 is larger than a slit width of the small slit 16cb1. The head of the bolt 50 is located in the large slit 16cb2 (see FIG. 5).

As shown in FIGS. 7B and 7C, the slit portion 17cb includes a bolt hole 17cb1 and a slit 17cb2. The bolt hole 17cb1 is provided on the boss body 17ca. For example, the bolt hole 17cb1 is provided on the tip end side of the boss body 17ca. The shaft of the bolt 50 is inserted into the bolt hole 17cb1 (see FIG. 5).

The slit 17cb2 is provided on the boss body 17ca so as to be adjacent to the bolt hole 17cb1. For example, the slit 17*ccb*2 is provided on the base end side of the boss body 17*ca*. A slit width of the slit 17*cb*2 is larger than a diameter of the bolt hole 17*cb*1. The nut 51 is located in the slit 17*cb*2. The slit width extends in a direction perpendicular to a bolt axis center B1. For example, the slit width extends in the front-rear direction along the facing surfaces 16*a*1, 17*a*1 of the cover bodies 16*a*, 17*a*.

As shown in FIGS. 6B, 6C, 7B, and 7C, at least one first positioning protrusion 16*d*, 17*d* is used to position the covers 16, 17 on the housing body 31. At least one first positioning protrusion 16*d*, 17*d* respectively protrudes from the cover body 16*a*, 17*a*. At least one first positioning protrusion 16*d*, 17*d* is disposed along an inner peripheral surface of the pair of discharge outlets 34, 35 (see FIG. 3B).

In the present preferred embodiment, an example is described in which at least a plurality of first positioning protrusions 16*d*, 17*d* are provided, for example, five first positioning protrusions 16*d*, 17*d*.

As shown in FIGS. 6B, 6C, 7B, and 7C, the seals 18*a*, 18*b* (see FIG. 5) are located in the seal grooves 16*e*, 17*e*. The seal grooves 16*e*, 17*e* have a groove shape on the cover bodies 16*a*, 17*a*. The seal grooves 16*e*, 17*e* have a groove shape so as to surround the bosses 16*c*, 17*c*. The seal grooves 16*e*, 17*e* have a groove shape on the facing surfaces 16*a*1, 17*a*1 of the cover bodies 16*a*, 17*a*, which face the bottom portions 38*a*, 39*a* of the cover receiving portions 38, 39 so as to surround the bosses 16*c*, 17*c*.

As shown in FIGS. 6A, 6B, 6C, 7A, 7B, and 7C, the holes 16*f*, 17*f* for the tool are used when the bolt 50 is screwed into the nut 51. The holes 16*f*, 17*f* for the tool are provided on the cover bodies 16*a*, 17*a* and the bosses 16*c*, 17*c*. The holes 16*f*, 17*f* for the tool are connected to the slit portions 16*cb*, 17*cb* of the bosses 16*c*, 17*c*. For example, the holes 16*f*, 17*f* for the tool are respectively connected to the large slit 16*cb*2 and the slit 17*cb*2 of the bosses 16*c*, 17*c*.

One of the covers 16, 17 further includes a second positioning protrusion 16*h* (an example of a second protrusion). In the present preferred embodiment, an example in which the cover 16 further includes the second positioning protrusion 16*h* is described. The second positioning protrusion 16*h* projects from the cover body 16*a*. The second positioning protrusion 16*h* is located in the positioning recess 38*b* (see FIG. 3B) of the cover receiving portion 38 of the housing 14.

The second positioning protrusion 16*h* is provided on the cover body 16*a* in order to distinguish the cover 16 from the cover 17. The positioning recess 38*b* is provided only on the cover receiving portion 38. In other words, the positioning recess 38*b* is not provided on the cover receiving portion 39.

Thus, it is possible to prevent erroneous assembly of the cover 16 with respect to the cover receiving portion 39 and erroneous assembly of the cover 17 with respect to the cover receiving portion 38 by disposing the second positioning protrusion 16*h* of the cover 16 in the positioning recess 38*b* of the cover receiving portion 38.

The second positioning protrusion 16*h* may be provided on the cover 17. In this case, the positioning recess 38*b* is provided on the cover receiving portion 39.

The pair of covers 16, 17 including the above configuration are attached to the housing 14 as follows. First, the seals 18*a*, 18*b* are respectively located in the seal grooves 16*e*, 17*e* of the covers 16, 17. Next, the bolt 50 is located in the boss 16*c* of the cover 16 and the nut 51 is provided on the boss 17*c* of the cover 17.

For example, the bolt 50 is located in the slit portion 16*cb* (the large slit 16*cb*2 and the small slit 16*cb*1) of the boss 16*c*, and the nut 51 is located in the slit portion 17*cb* (the slit 17*cb*2) of the boss 17*c*.

Subsequently, the bosses 16*c*, 17*c* of the covers 16, 17 are respectively located inside the discharge outlets 34, 35 of the cover receiving portions 38, 39. Thus, the shaft of the bolt 50 is adjacent to the nut 51 in a state where the shaft of the bolt 50 is located in the slit portions 16*cb*, 17*cb* (the small slit 16*cb*1, the bolt hole 17*cb*1) of the bosses 16*c*, 17*c*. In this state, the plurality of first positioning protrusions 16*d*, 17*d* respectively face the discharge outlets 34, 35.

Subsequently, the tool is inserted into the hole 16*f* for the tool. The tool may be a hexagon wrench, a Phillips screwdriver, a flat head screwdriver, and the like. In this state, the bolt 50 is screwed into the nut 51 by rotating the tool.

The plurality of first positioning protrusions 16*d*, 17*d* of the covers 16, 17 are respectively located inside the discharge outlets 34, 35 along the inner peripheral surfaces of the discharge outlets 34, 35 of the cover receiving portions 38, 39. Further, the covers 16, 17 and the seals 18*a*, 18*b* contact the bottom portions 38*a*, 39*a* of the cover receiving portions 38, 39. Thus, the covers 16, 17 are respectively provided on the cover receiving portions 38, 39 via the seals 18*a*, 18*b*.

In a state where the covers 16, 17 and the seals 18*a*, 18*b* are provided on the cover receiving portions 38, 39, a gap is provided between the tips of the pair of bosses 16*c*, 17*c*. Thus, the covers 16, 17 are connected to each other in a state where the covers 16, 17 and the seals 18*a*, 18*b* press the bottom portions 38*a*, 39*a* of the cover receiving portions 38, 39.

The configuration of the above-described preferred embodiments may be as follows.

Figure 8:
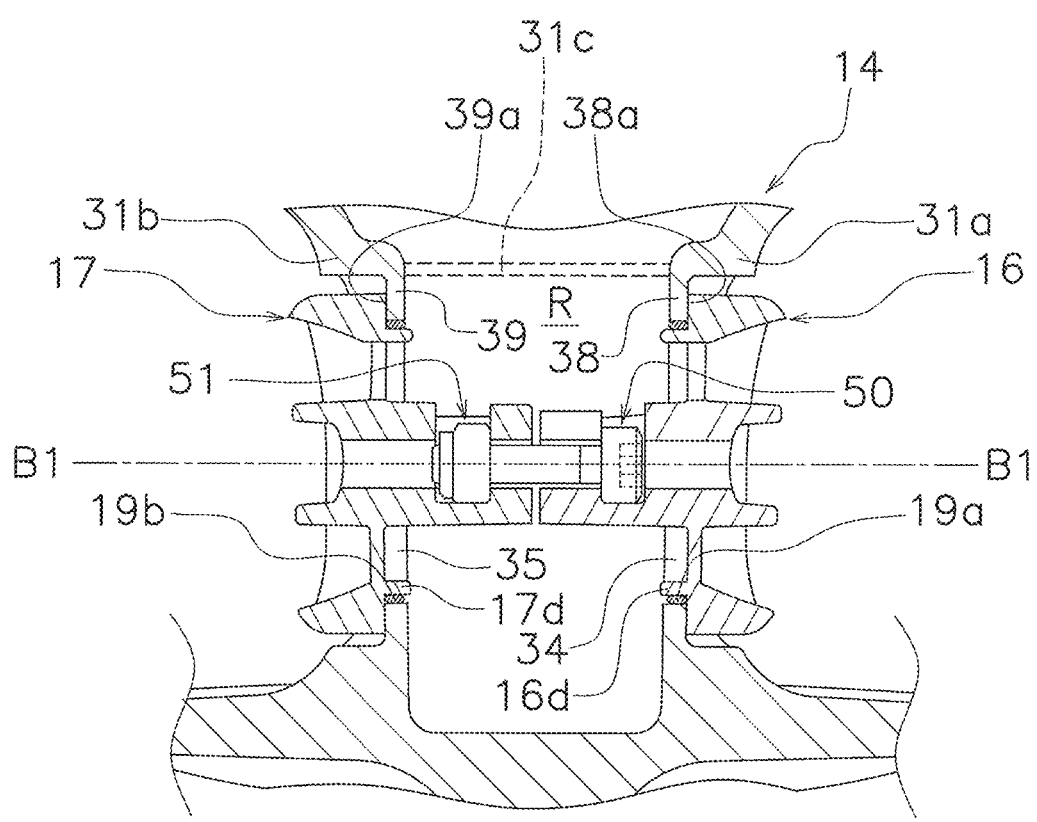
FIG. 8 is cross-sectional view of a vicinity of the cavitation plate of the outboard motor according to a first alternative preferred embodiment of the present invention.

In the above-described preferred embodiments, an example is described in which the seals 18*a*, 18*b* are respectively located between the bottom portions 38*a*, 39*a* of the cover receiving portions 38, 39 and the facing surfaces 16*a*1, 17*a*1 of the cover bodies 16*a*, 17*a*. Instead of this, as shown in FIG. 8, seals 19*a*, 19*b* may be respectively located between an inner peripheral surfaces of the discharge outlets 34, 35 and the first positioning protrusions 16*d*, 17*d*. Both of the seals 18*a*, 18*b* of the above-described preferred embodiments and the seals 19*a*, 19*b* of this variation may be used.

Figure 9:
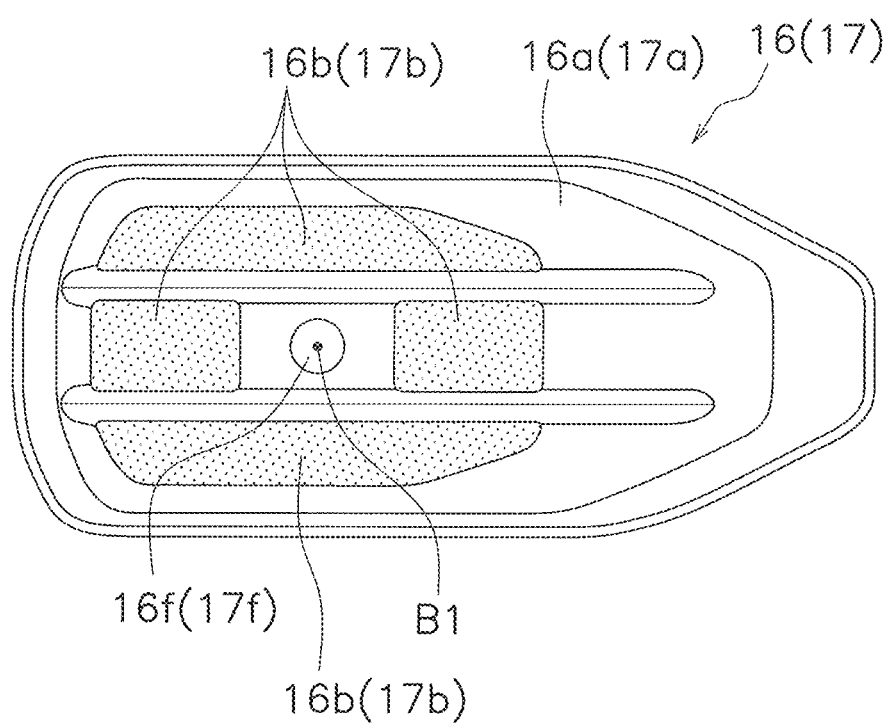
FIG. 9 is a top view of the cover of the outboard motor according to a second alternative preferred embodiment of the present invention.

In the above-described preferred embodiments, as shown in FIGS. 6A and 7A, an example is described in which three exhaust openings 16*b*, 17*b* are provided as the portions indicated by hatching. Instead of this, as shown in FIG. 9, four exhaust openings 16*b*, 17*b* may be provided on the covers 16, 17.

In the above-described preferred embodiments, an example is described in which the seal grooves 16*e*, 17*e* are provided on the covers 16, 17. The seal grooves 16*e*, 17*e* may be provided on the housing 14, for example, the bottom portions 38*a*, 39*a* of the cover receiving portions 38, 39.

With the outboard motor 5 including the above-described configuration, the covers 16, 17 made of a non-metal material are attached to the housing 14 so as to cover the discharge outlets 34, 35. In this state, the exhaust gas, which is discharged from the engine 9, is discharged to the outside of the housing 14 through the exhaust openings 16*b*, 17*b* of the covers 16, 17.

In this configuration, the exhaust gas, which is discharged from the exhaust openings 16*b*, 17*b* of the covers 16, 17, adheres to the outer surface around the exhaust openings 16*b*, 17*b*. In this case, discoloration around the exhaust openings 16b, 17b of the covers 16, 17 is significantly reduced or prevented because the covers 16, 17 are made of a non-metal material.

With the outboard motor 5, the discoloration around the exhaust openings 16b, 17b of the covers 16, 17 is significantly reduced or prevented because the covers 16, 17 are made of a resin.

With the outboard motor 5, the discoloration around the exhaust openings 16b, 17b of the covers 16, 17 is significantly reduced or prevented in a state where the discharge outlets 34, 35 are provided between the engine 9 and the cavitation plate 32.

With the outboard motor 5, the discoloration around the exhaust openings 16b, 17b of the covers 16, 17 is significantly reduced or prevented in a state where the discharge outlets 34, 35 are located on the cover receiving portions 38, 39 of the housing 14.

With the outboard motor 5, the covers 16, 17 are suitably positioned on the housing 14 by locating the first positioning protrusions 16d, 17d of the covers 16, 17 on the discharge outlets 34, 35 of the cover receiving portions 38, 39.

With the outboard motor 5, the exhaust gas is suitably discharged from the exhaust openings 16b, 17b of the covers 16, 17 because the seals 18a, 18b, 19a, 19b are located between the housing 14 and the covers 16, 17.

With the outboard motor 5, the seal 18 suitably abuts the housing 14 and the covers 16, 17 because the seals 18a, 18b are located in the seal grooves 16e, 17e.

With the outboard motor 5, the covers 16, 17 are easily and surely attached to the housing 14 because the pair of covers 16, 17 are connected to each other by the bolt 50 and the nut 51.

With the outboard motor 5, the second positioning protrusion 16h is provided only on the cover 16 and is located in the positioning recess 38b provided on one side surface of the housing 14. Thus, it is possible to prevent erroneous assembly of the pair of covers 16, 17.

With the outboard motor 5, the cooling water and the exhaust gas are suitably discharged from the discharge chamber R to the outside of the housing 14 through the exhaust openings 16b, 17b of the covers 16, 17 and the discharge outlets 34, 35 because the exhaust passage P1 and the cooling water passage P2 are connected to the discharge chamber R.

The configuration of the above-described preferred embodiments may be as follows.

In the above-described preferred embodiments, an example is described in which the exhaust passage P1 and the cooling water passage P2 are connected to the discharge chamber R. Instead of this, one of the exhaust passage P1 and the cooling water passage P2 may be connected to the other of the exhaust passage P1 and the cooling water passage P2, and the other of the exhaust passage P1 and the cooling water passage P2 may be connected to the discharge chamber R.

In this case, the walls 37a for the exhaust gas in FIG. 4 is connected to the walls 37b for the cooling water passage P2 which is provided between the engine 9 and the discharge chamber R. The same effects as the above effects are obtained with this configuration.

In the above-described preferred embodiments, an example is described in which the covers 16, 17 include three or four exhaust openings 16b, 17b. The number of the exhaust openings 16b, 17b of the covers 16, 17 may be any number, as long as the number of the exhaust openings 16b, 17b is one or more.

According to preferred embodiments of the present invention, an outboard motor 5 is able to significantly reduce or prevent discoloration around an exhaust opening.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
    an engine;
    a drive shaft extending downward from the engine;
    a propeller shaft extending in a direction intersecting with the drive shaft;
    a housing to accommodate the engine, the drive shaft, and the propeller shaft and that includes a discharge outlet to discharge exhaust gas and cooling water of the engine;
    a discharge passage inside the housing to guide the exhaust gas and the cooling water from the engine to the discharge outlet; and
    a non-metal cover detachably attached to the housing to cover the discharge outlet and including at least one exhaust opening; wherein
    the discharge outlet includes a pair of discharge outlets;
    the cover includes a pair of covers; and
    the pair of covers cover the pair of discharge outlets respectively and are connected to each other by a connector.

2. The outboard motor according to claim 1; wherein
    the housing is made of metal; and
    the pair of covers are made of resin.

3. The outboard motor according to claim 1, further comprising:
    a cavitation plate provided on the housing; wherein
    the pair of discharge outlets are provided on the housing between the engine and the cavitation plate.

4. The outboard motor according to claim 1, wherein
    the housing includes a pair of cover receiving portions having a concave shape to receive the pair of covers; and
    the pair of discharge outlets are located in the pair of cover receiving portions.

5. The outboard motor according to claim 1, wherein the cover includes first protrusions located on the pair of discharge outlets.

6. The outboard motor according to claim 1, further comprising a seal located between the housing and the pair of covers.

7. The outboard motor according to claim 6, wherein one of the housing and the pair of covers includes a recess in which the seal is located.

8. The outboard motor according to claim 1, wherein
    one of the pair of covers includes a protrusion; and
    the housing includes a recess in which the protrusion is located.

9. The outboard motor according to claim 1, wherein
    the discharge passage includes a discharge chamber, a first passage, and a second passage;
    the discharge chamber guides the exhaust gas and the cooling water toward the pair of discharge outlets;
    the first passage guides the exhaust gas toward the discharge chamber; and
    the second passage guides the cooling water toward the discharge chamber.

10. The outboard motor according to claim 1, wherein
the discharge passage includes a first passage and a second passage;
the first passage guides the exhaust gas;
the second passage guides the cooling water; and
one of the first passage and the second passage is connected to the other of the first passage and the second passage.

\* \* \* \* \*